Oct. 16, 1945.  H. O. HEM  2,387,148
TILTABLE DYNAMOMETER
Filed April 29, 1943  3 Sheets-Sheet 1
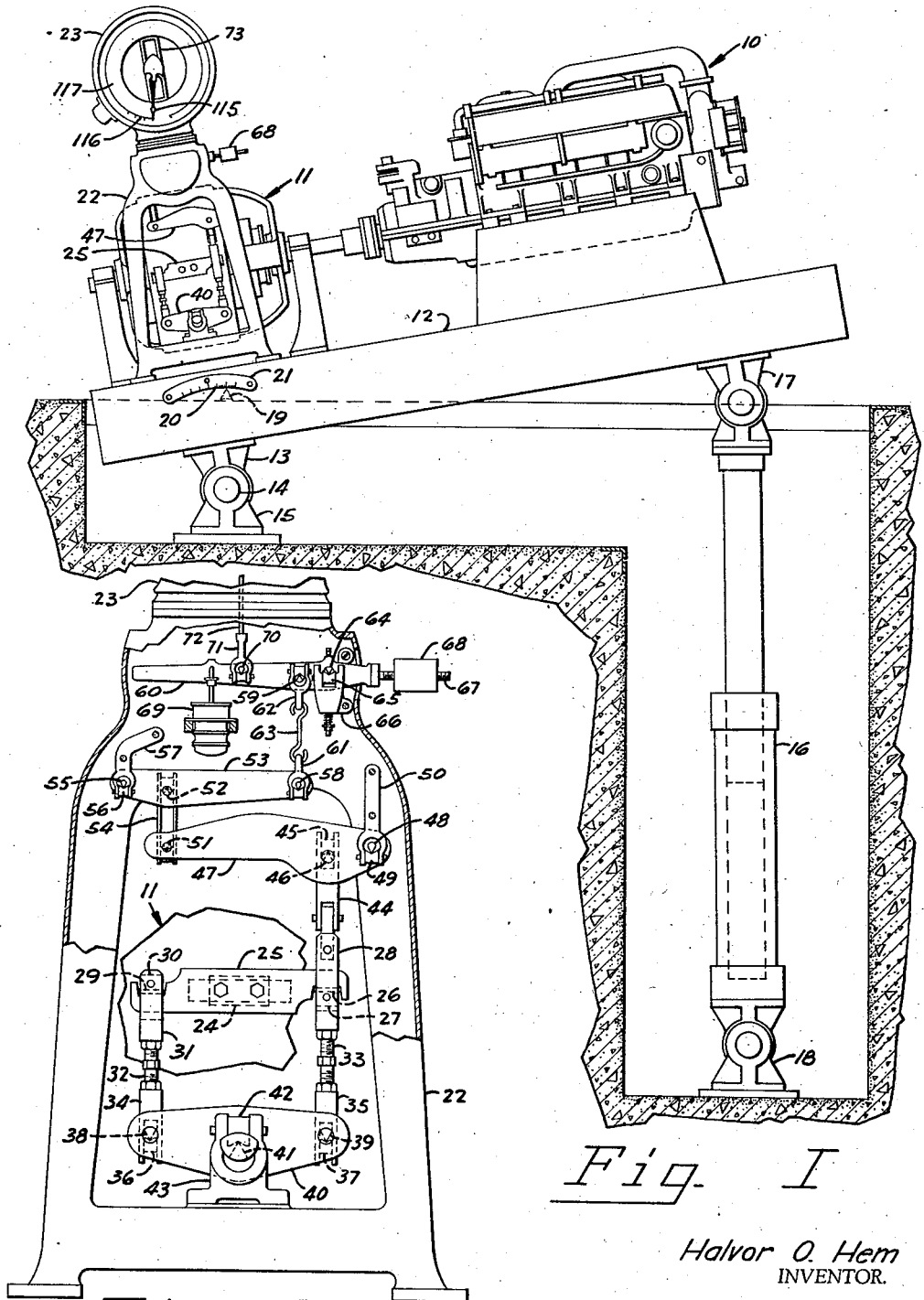
Fig. I
Fig. II
Halvor O. Hem
INVENTOR.
BY Marshall & Marshall
ATTORNEYS Oct. 16, 1945.   H. O. HEM   2,387,148
TILTABLE DYNAMOMETER
Filed April 29, 1943   3 Sheets-Sheet 2
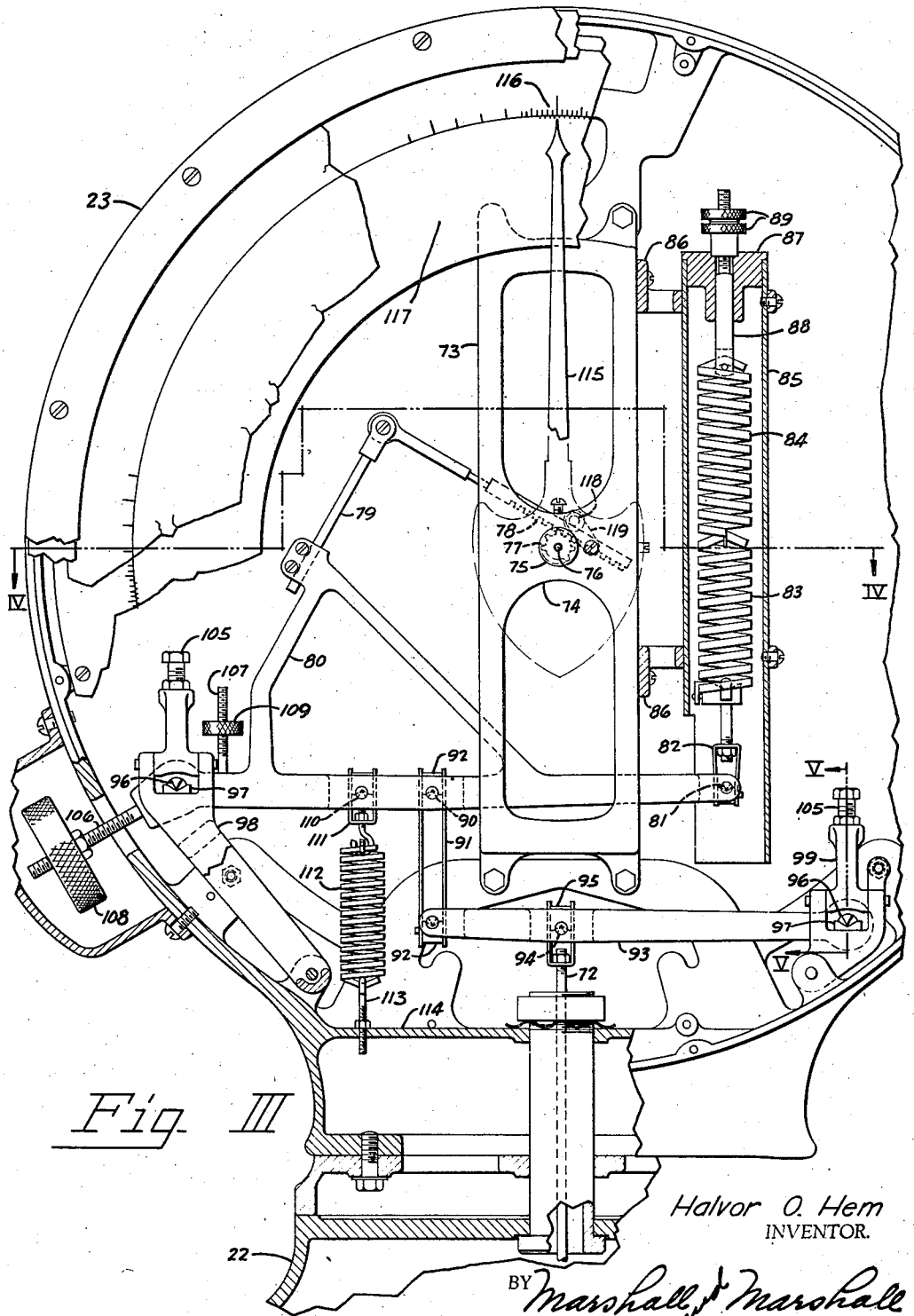
Fig. III
Halvor O. Hem
INVENTOR.
BY Marshall & Marshall
ATTORNEYS Oct. 16, 1945.  H. O. HEM  2,387,148
TILTABLE DYNAMOMETER
Filed April 29, 1943  3 Sheets-Sheet 3
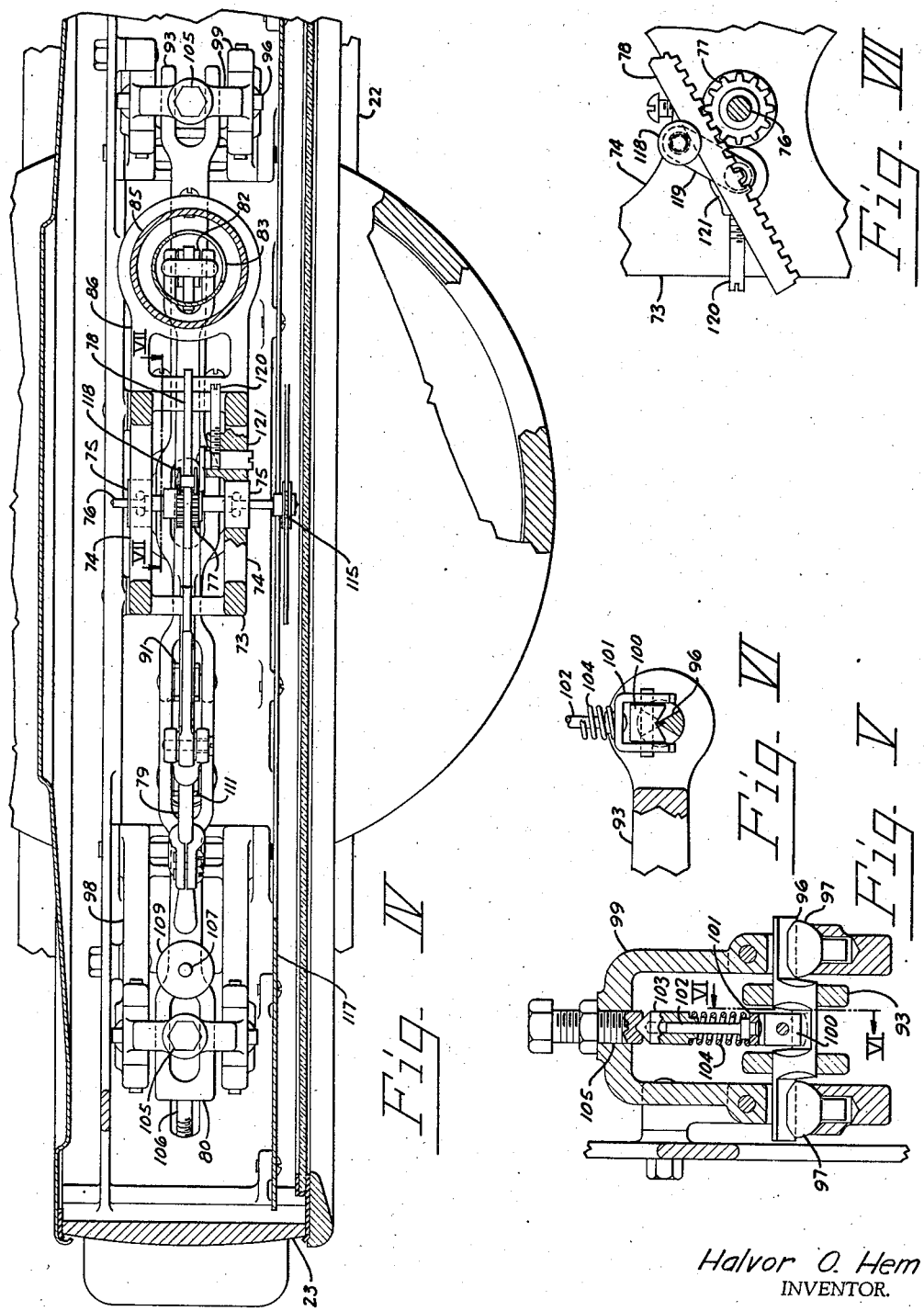
Halvor O. Hem
INVENTOR.
BY Marshall & Marshall
ATTORNEYS Patented Oct. 16, 1945

2,387,148

UNITED STATES PATENT OFFICE 2,387,148

TILTABLE DYNAMOMETER

Halvor O. Hem, Toledo, Ohio, assignor to Toledo Scale Company, Toledo, Ohio, a corporation of New Jersey Application April 29, 1943, Serial No. 485,034

5 Claims. (Cl. 73—136)

This invention relates to dynamometers, and particularly to dynamometers so mounted that the dynamometer and the device under test may be titlted together about horizontal axes, thereby allowing the effect of departures from level on the device to be ascertained.

An object of this invention is to provide a force counterbalancing and indicating means, the accuracy of which is unaffected by tilting.

A further object of this invention is to provide means for maintaining the connection between balanced levers in operable position.

A still further object is to provide adjustable means between a lever system connected to an automatic counterbalance and an indicating system, to facilitate adjustment of the indicating system to the characteristics of the counterbalance.

More specific objects and advantages are apparent from the description, in which reference is had to the accompanying drawings illustrating a preferred embodiment of the invention.

In the drawings:

Fig. I is a view in side elevation of a tiltable dynamometer installation embodying the invention.

Fig. II is an enlarged fragmentary view of a portion of the force transmitting system of the dynamometer installation, parts of the frame being shown in section.

Fig. III is a further enlarged fragmentary front elevational view of the upper portion of the force counterbalancing system, parts of the frame being broken away and parts shown in section.

Fig. IV is a further enlarged fragmentary view, partly in section, taken substantially along the line IV—IV of Fig. III, parts being broken away.

Fig. V is a detailed sectional view along the line V—V of Fig. III.

Fig. VI is a detailed sectional view along the line VI—VI of Fig. V.

Fig. VII is a detailed fragmentary rear elevational view partly in section along the line VII—VII of Fig. IV.

These specific drawings and the specific description that follows merely disclose and illustrate the invention and are not intended to impose limitations upon the claims.

In the apparatus shown in the drawings the engine 10 under test and the dynamometer 11 are mounted on a tiltable common base 12. One end of the base 12 is supported on a hinge-like structure composed of a bracket 13 dependent from the base 12, a shaft 14 and a pedestal 15. The other end of the base 12 is supported by a hydraulic cylinder 16 interposed between another bracket 17 and another pedestal 18.

The tilt of the base 12 is indicated by a fixed indicator 19 cooperating with a series of indicia 20 on a chart 21 attached to the side of the base 12.

Attached to the base 12 at the side of the dynamometer is a substantially A-shaped frame 22 surmounted by a watch-case shaped housing 23. On an arm 24 extending from the side of the dynamometer is rigidly mounted a knife-edge bar 25 having a downwardly directed knife-edge 26 cooperating with a V bearing 27 in a stirrup 28.

The knife-edge bar 25 also is provided with an upwardly directed knife-edge 29 engaging a V bearing 30 in a stirrup 31. Suspended below the stirrups 28 and 31 by means of threaded rods 32 and 33 are stirrups 34 and 35 containing V bearings 36 and 37. These bearings engage downwardly directed knife-edges 38 and 39 mounted transversely near the ends of a reversing lever 40. An upwardly directed knife-edge 41 mounted in the lever 40 equidistant from the knife-edges 38 and 39 engages V bearings 42 in a bracket 43 bolted to the frame 22. The lever 40 and associated links serve to convert an upwardly directed force from the dynamometer into a downwardly acting force applied to the stirrup 28.

The stirrup 28 is suspended by means of a link 44 and V bearing 45 from the load pivot 46 of a lever 47.

The fulcrum pivot 48 of the lever 47 is carried on a V bearing 49 in a straight-stemmed bracket 50 mounted in the interior of the frame 22. The power pivot 51 of the lever 47 is operatively connected to the load pivot 52 of a second lever 53 by links 54. The fulcrum pivot 55 of the second lever 53 rests on V blocks 56 in a bent-stemmed bracket 57 mounted in the frame 22.

The power pivot 58 of the second lever 53 is operatively connected to the load pivot 59 of a third lever 60 by a pair of stirrups 61 and 62 and a hook 63.

The fulcrum pivot 64 of the third lever 60 is carried on bearings 65 in a bracket 66 mounted in the frame 22. Means not shown firmly hold the pivot seated in the bearing.

A threaded extension 67 of the third lever 60 carries a balance weight 68 which counterbalances the pull due to the weight of the three levers and the connections, and a portion of the weight of the reversing lever 40.

Near its other end the third lever 60 is connected to a dashpot 69.

The power pivot 70 in the third lever 60 bears on a stirrup 71 suspended from a rod 72 which serves to connect the force transmitting means in the base frame 22 with the counterbalance in the housing 23.

The interior rim of the watch-case shaped housing 23 is provided with cast-in flanges, top and bottom, to which is bolted a framework 73. This framework is a box-like structure having its sides cut away, leaving the four corners tied together by webs at each end and at the middle. The middle webs 74 are bored to receive indicator shaft bearings 75.

An indicator shaft 76, journalled in the bearings 75, has near its center, between the bearings 75, a pinion 77 which meshes with and is driven by a rack 78. The rack 78 is pivotally attached to the upper end of a rod 79, adjustable in and forming an extension of one leg of a substantially A-shaped lever 80 pivoted at its apex and having its other leg approximately horizontal. The horizontal portion of the A-shaped lever 80 is provided near its extremity with a knife-edge 81 engaging a bearing in a stirrup 82 suspended from weigh springs 83 and 84. These weight springs are enclosed in an open-bottomed tube 85 carried in brackets 86 bolted to the side of the box-like structure 73. The upper end of the tube 85 is closed by a fitted plug 87. This plug is machined axially to receive a square rod 88 whose upper end is turned and threaded to receive adjusting and locking nuts 89. The lower end of the square rod 88 is slotted and fitted with a pin, thus forming an eye to receive the upper end of the weigh spring 84.

A load pivot 90 inserted near the middle of the horizontal portion of the A-shaped lever 80 is operatively connected by links 91 and bearings 92 to the power pivot of a lower lever 93. The load pivot 94 of this lower lever 93 is operatively connected to the force transmitting system in the base 22 by a bearing and stirrup 95 attached to the upper end of the steelyard rod 72.

The apex of the A-shaped lever 80 and the fulcrum end of the lower lever 93 are fitted with two-way pivots 96. The downward thrust of these pivots is taken by bearings 97 supported in brackets 98 and 99 mounted in the housing 23.

The fulcrum pivot 96 of the lower lever 93 is firmly held in its bearings by a hold-down comprising a V bearing 100 resting upon the upwardly directed portion of the pivot 96. The V bearing 100 is held in an inverted U-shaped clip 101 which is fitted with a long stem 102 riveted through the top of the U. A generally cylindrical member 103 adapted to slide on the stem 102 holds a compression spring 104, slipped over the stem 102, between the lower face of the generally cylindrical member 103 and the clip 101. The conical upper end of the cylindrical member 103 is held in a cone-shaped recess in the lower end of a bolt 105 threaded through an arch-shaped portion of the bracket 99. The amount of hold-down force is determined by the compression of the spring 104 effected by the bolt 105 acting through the cylindrical member 103.

The structure in the fulcrum bracket 98 supporting the A-shaped lever 80 is similar to that in the fulcrum bracket 99 just described.

The A-shaped lever 80 near its apex is provided with two threaded extensions 106 and 107. The extension 106 extends from the apex of the A-shaped lever in a direction roughly opposite to that of the bisector of the angle between the legs, and the other extension 107 is vertical. These extensions carry balancing weights 108 and 109 of such size that the lever 80, acted upon by the pull due to the weight of the lower lever 93 and the connections, may be balanced vertically and horizontally upon its fulcrum.

The A-shaped lever 80 is further provided with a knife-edge 110 between its fulcrum and its load pivot. To a stirrup 111 containing a bearing resting on the pivot knife-edge 110 is connected one end of a tension spring 112 whose other end is held by a hook 113 tapped into a flange 114 in the bottom of the housing 23. This spring load serves to hold the weigh springs 83 and 84 and the connections to the A-shaped lever firmly in place when the force being counterbalanced is zero or very small.

The indicator shaft 76 carries an indicator 115 adapted to sweep over a series of indicia 116 on a circular chart 117 mounted within the housing 23.

The rack 78 is ordinarily held in mesh with the pinion 76 by the force of gravity. To prevent disengagement on sudden load changes a guard is provided which comprises a flanged roller 118 journalled at the free end of an arm 119, which in turn is attached to a plug adjustably held by means of a set screw 120 in a boss 121 in the web 74 of the frame 73.

Any force exerted on the knife-edge bar 25 due to the tendency of the dynamometer frame to rotate when power is delivered or absorbed is transmitted through the lever system and extends the weigh springs 83 and 84. The resulting motion of the A-shaped lever 80 is transmitted through the rack and pinion to the indicator 115 which is thereby moved over the chart 117 in proportion to the extension of the weigh springs 83 and 84.

The lever system may be brought into neutral equilibrium by adjustment of the balance weights 68, 108 and 109. When so adjusted the frame 22 and associated structure may be tipped either way without producing any net turning moment on the levers. Under these conditions forces from the dynamometer are counterbalanced by the weigh springs and indicated by the indicator, said indications being unaffected by tilting of the dynamometer and the force counterbalancing means.

The indicator is easily adjusted to zero by raising or lowering the weigh spring support 88 by rotation of the nuts 89. The indicator travel is brought into agreement with the counterbalance springs by adjusting the rod 79 in or out of its mounting in the A-shaped lever 80.

Having described my invention, I claim:

1. In testing equipment of the class described, in combination, a base mounted on and tiltable about a fixed horizontal axis, said base being adapted to support the device under test, a dynamometer mounted on said base with its axis of rotation lying in a plane perpendicular to said horizontal axis, force counter-balancing means mounted on said base and operatively connected to said dynamometer, said force counterbalancing means comprising a balanced nonpendulous lever system and a spring counter-balance connected thereto, and indicating means operatively connected to said lever system to indicate the magnitude of the force counterbalanced.

2. In apparatus of the class described, in combination, a base mounted on a horizontal axis, mechanism for tilting said base about the horizontal axis, means for mounting the device to be tested on said base, a dynamometer mounted on said base with its axis of rotation lying in a plane perpendicular to said horizontal axis, in operative relation to the device to be tested, and weighing means for counterbalancing and indicating the torque of said dynamometer, said weighing means including a balanced nonpendulous lever system and a spring counterbalance.

3. In apparatus of the class described, in combination, a base mounted on a fixed horizontal axis, said base being adapted to support the device to be tested in tilted positions, mechanism for tilting the base and indicating the amount of tilt, a dynamometer mounted on said base, with its axis of rotation lying in a plane perpendicular to the fixed horizontal axis, and a weighing scale comprising a balanced lever system and a spring counterbalance mounted on said base and operatively connected to said dynamometer.

4. In apparatus of the class described, in combination, a frame, a fixedly located pivotal support for said frame, means for tilting said frame about said fixedly located pivotal support, means for rigidly attaching a device to be tested to said frame, a dynamometer mounted on said frame and operatively connected to the device to be tested, and means mounted on said frame for counterbalancing and indicating the torque exerted by said dynamometer.

5. In apparatus of the class described, in combination, a frame, a dynamometer mounted on said frame, force counterbalancing and indicating mechanism connected to said dynamometer, means for mounting a device to be tested on said frame and operatively connecting it to said dynamometer, a fixed pivotal support for said frame and a hydraulic cylinder for tilting said frame and attached mechanism on said pivotal support.

HALVOR O. HEM.